United States Patent
Brotto et al.

(10) Patent No.: US 11,763,649 B2
(45) Date of Patent: *Sep. 19, 2023

(54) SYSTEM AND METHOD FOR DETERRING THEFT

(71) Applicant: BLACK & DECKER INC., New Britain, CT (US)

(72) Inventors: Daniele C. Brotto, Baltimore, MD (US); Nathan J. Cruise, Phoenix, MD (US); Jeremy D. Ashinghurst, Baltimore, MD (US); Jason K. Leh, Shrewsbury, PA (US); Richard Haggarty, Towson, MD (US); Michael J. Stoller, Silver Spring, MD (US); Brice D. Farrell, Nottingham, MD (US); Regina Gracia C. Cunanan, Baltimore, MD (US); Raghavendra R. Byatnal, Cockeysville, MD (US); Matthew J. Velderman, Sparks, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,357

(22) Filed: Dec. 12, 2022

(65) Prior Publication Data
US 2023/0107795 A1 Apr. 6, 2023

Related U.S. Application Data

(63) Continuation of application No. 16/825,326, filed on Mar. 20, 2020, now Pat. No. 11,557,187, which is a
(Continued)

(51) Int. Cl.
G06Q 10/087 (2023.01)
H02P 7/18 (2006.01)
(Continued)

(52) U.S. Cl.
CPC ..... G08B 13/2402 (2013.01); G06K 19/0723 (2013.01); G06Q 10/087 (2013.01); H02P 7/18 (2013.01)

(58) Field of Classification Search
CPC .................................................. G06Q 10/0833
See application file for complete search history.

(56) References Cited

U.S. PATENT DOCUMENTS

| | | | |
|---|---|---|---|
| 2006/0061475 A1* | 3/2006 | Moskowitz | G08B 13/2417 340/572.3 |
| 2014/0158389 A1* | 6/2014 | Ito | B25F 5/00 173/46 |

(Continued)

Primary Examiner — Joseph H Feild
Assistant Examiner — Pameshanand Mahase
(74) Attorney, Agent, or Firm — Adan Ayala

(57) ABSTRACT

A theft deterring system includes a power tool with a motor connectable to a power source, a switch connected to the motor, a controller controlling to the switch for controlling an amount of power provided to the motor, and a state circuit having a memory for storing a state value. The controller activates the switch to provide power to the motor when the state value stored in the memory equals a desired value. The system may also include a tag programmer for changing the stored value.

10 Claims, 12 Drawing Sheets

Related U.S. Application Data continuation-in-part of application No. 16/795,759, filed on Feb. 20, 2020, which is a continuation-in-part of application No. 16/524,574, filed on Jul. 29, 2019.

(60) Provisional application No. 62/718,684, filed on Aug. 14, 2018.

(51) Int. Cl.
*H02P 31/00* (2006.01)
*G08B 13/24* (2006.01)
*G06Q 10/08* (2023.01)
*G06K 19/07* (2006.01)

(56) References Cited

U.S. PATENT DOCUMENTS

2016/0342151 A1* 11/2016 Dey, IV .............. G05B 19/4155
2016/0373457 A1* 12/2016 Matson ................. G08C 17/02
2019/0344421 A1* 11/2019 Lu ............................ G01L 5/22

* cited by examiner

SYSTEM AND METHOD FOR DETERRING THEFT

CROSS-REFERENCE TO RELATED APPLICATION

The present application is a continuation-in-part application of U.S. patent application Ser. No. 16/795,759, entitled "SYSTEM AND METHOD FOR DETERRING THEFT" and filed on Feb. 20, 2020, which is in turn a continuation-in-part application of U.S. patent application Ser. No. 16/524,574, entitled "SYSTEM AND METHOD FOR DETERRING THEFT" and filed on Jul. 20, 2019, which in turn derives priority from U.S. Patent Application No. 62/718,684, entitled "SYSTEM AND METHOD FOR DETERRING THEFT" and filed on Aug. 14, 2018, and wholly incorporated by reference.

FIELD

The present invention relates to a system and method for deterring theft, and more particularly to a system and method for deterring theft of items in a retail environment.

BACKGROUND

Theft of inventory at brick-and-mortar stores is a problem resulting in lost revenue and incorrect inventory reporting. Prior art solutions include putting the highly-stolen products under lock does not completely eliminate the problem as the theft can occur after the display lock has been unlocked. Theft deterrent systems such as antitheft lanyards and locks adversely burden the checkout processes, are costly, need to be maintained and interfere with the buying experience.

It is an object of the invention to provide an improved system and method for deterring theft of items in a retail environment. Preferably such system and method will provide a simple checkout procedure to validate the purchase.

DESCRIPTION OF THE DRAWINGS

Preferred embodiments of the invention will now be described, by way of example, with reference to the accompanying drawings, of which.

DETAILED DESCRIPTION

Figure 1:
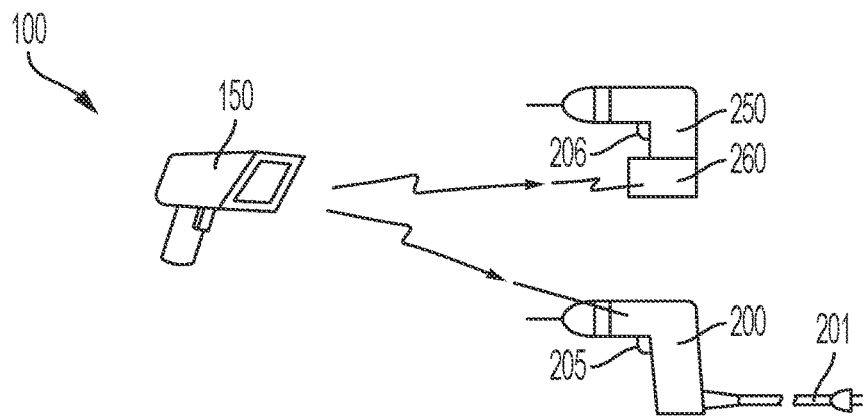
FIG. 1 illustrates a first embodiment of the theft deterring system.
Figure 2:
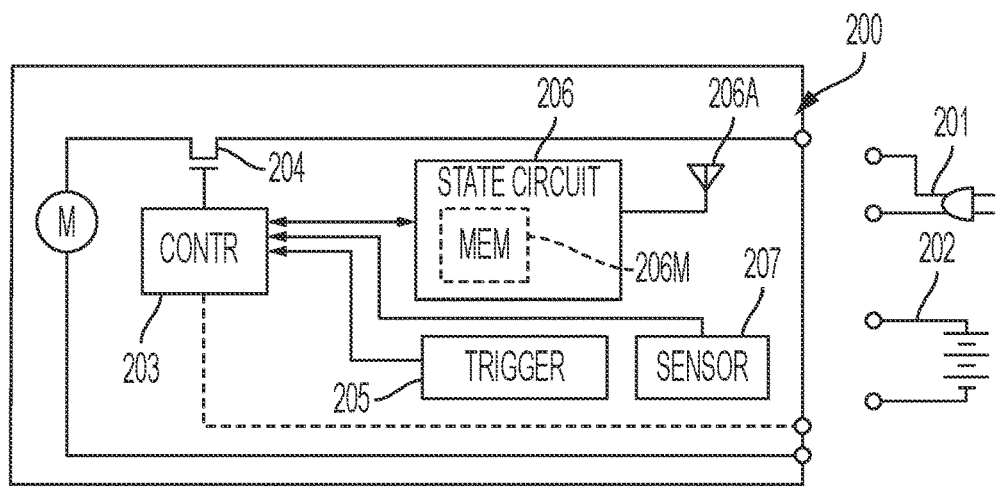
FIG. 2 is a block diagram of a first embodiment of a power tool that is part of the theft deterring system.

FIG. 1 illustrates a first embodiment of a theft deterring system 100, which preferably includes a power tool 200 and/or 250, and a tag programmer 150. Referring to FIG. 2, power tool 200 may have a motor M connected to a power source, such as AC power via power cord 201, or battery pack 202. A controller 203 may control a switch or FET 204 for controlling the amount of power provided to motor M. Controller 203 may use inputs from the trigger 205 and other sensors 207 to vary the amount of power provided to motor M.

Controller 203 may also receive input from a state circuit 206. State circuit 206 may have a memory 206M which stores a state value. State circuit 206 may have an antenna 206A which receives a signal from tag programmer 150. Persons skilled in the art may recognize that state circuit 206 may be a passive RFID tag circuit with rewritable memory (which can be powered by the signal transmitted by tag programmer 150), or an active RFID tag with rewritable memory (which can be powered by the AC power source, battery pack 202 or a separate battery (not shown).

With such arrangement, the memory 206M can be set to have a value representative of a first state. For example, such value may be "0" which could represent an unactivated state. Such value can be set at manufacture or during shipping from the factory.

Figure 12:
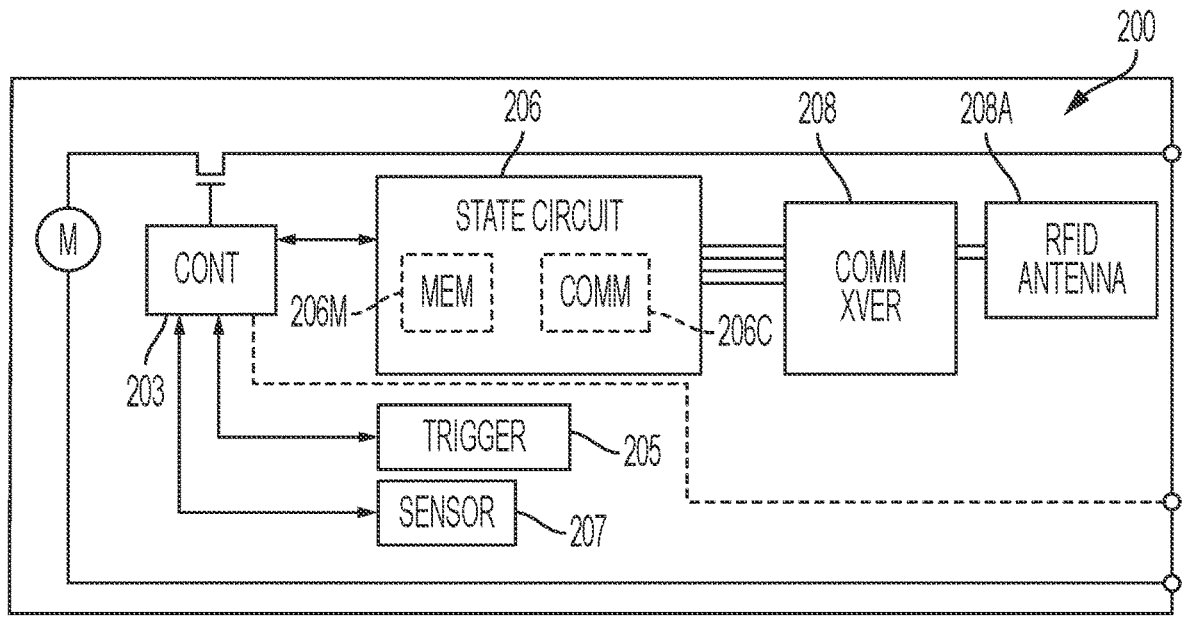
FIG. 12 is a block diagram of a third embodiment of a power tool that is part of the theft deterring system.

FIG. 12 shown an alternative embodiment of power tool 200, where state circuit 206 communicates via a 4-wire link to a communication circuit 208, which in turn is connected to an antenna 208A. Preferably antenna 208A is an UHF RFID antenna, designed to operate at a frequency between 815 MHz and 925 MHz. Antenna 208A is preferably connected to communication circuit 208 via a 2 wire serial interface. Persons skilled in the art shall recognize that communication circuit 208 may be powerable by a power supply within power tool 200 and/or antenna 208A.

A person may take such power tool 200 from a store display to a point-of-sale (POS) system, such as a register, for payment. At that time, a store employee can use tag programmer 150 to change the value set in memory 206M. For example, such value can be changed to "1" which could represent an activated state. When the person then tries to use the power tool 200, controller 203 would query state circuit 206 (and/or memory 206M) when trigger 205 is activated. Once controller 203 sees the value representing the activated state, it can provide power to the motor M.

If a person were to steal power tool 200 without it being properly processed at check out, the value set in memory 206M would not be changed. As before, when the person then tries to use the power tool 200, controller 203 would query state circuit 206 (and/or memory 206M) when trigger 205 is activated. Because controller 203 would not see the value representing the activated state (or instead see a value representing the unactivated state), controller 203 would not provide any power to the motor M, or instead it could provide power to motor M at a lower amount than if the memory 206M had the value representing the activated state.

Persons skilled in the art shall recognize that the system 100 can have more than two states. For example, memory 206M could be programmed to have different values representing unactivated, partly activated and fully activated states. In the unactivated state, power tool 200 may not turn on, may only work at a lower setting than when fully activated, and/or may only have some features (such a motor soft start) working, if any. In the partly activated state, power tool 200 may only work at a lower setting than when fully activated and/or may work at the same setting as a fully activated power tool but only have some features (such a motor soft start) working, if any. In the fully activated state, power tool 200 may work at the full settings and/or have all features (such a motor soft start) working.

Figure 13:
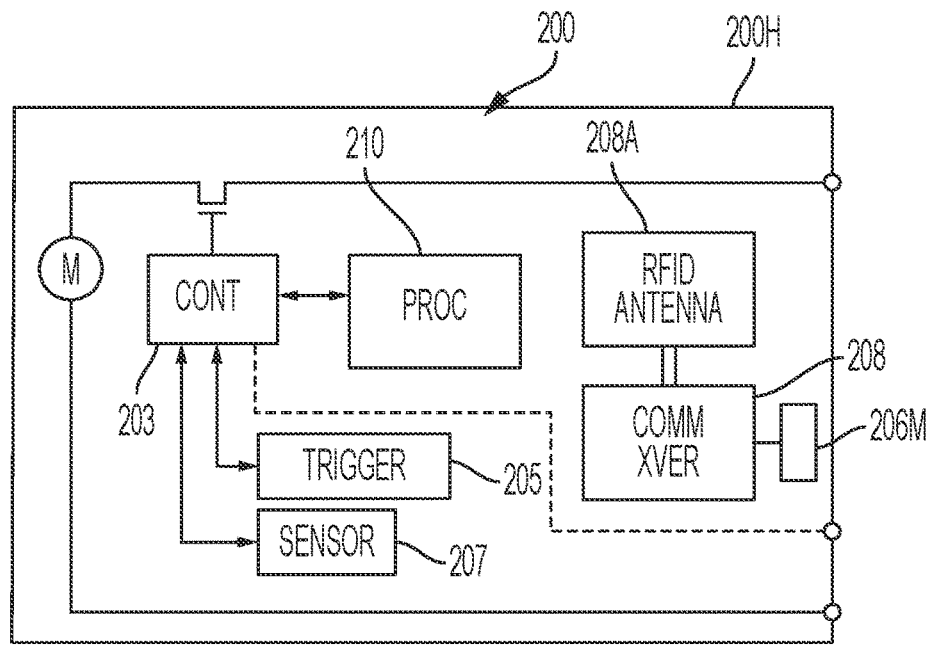
FIG. 13 is a block diagram of a fourth embodiment of a power tool that is part of the theft deterring system.
Figure 14:
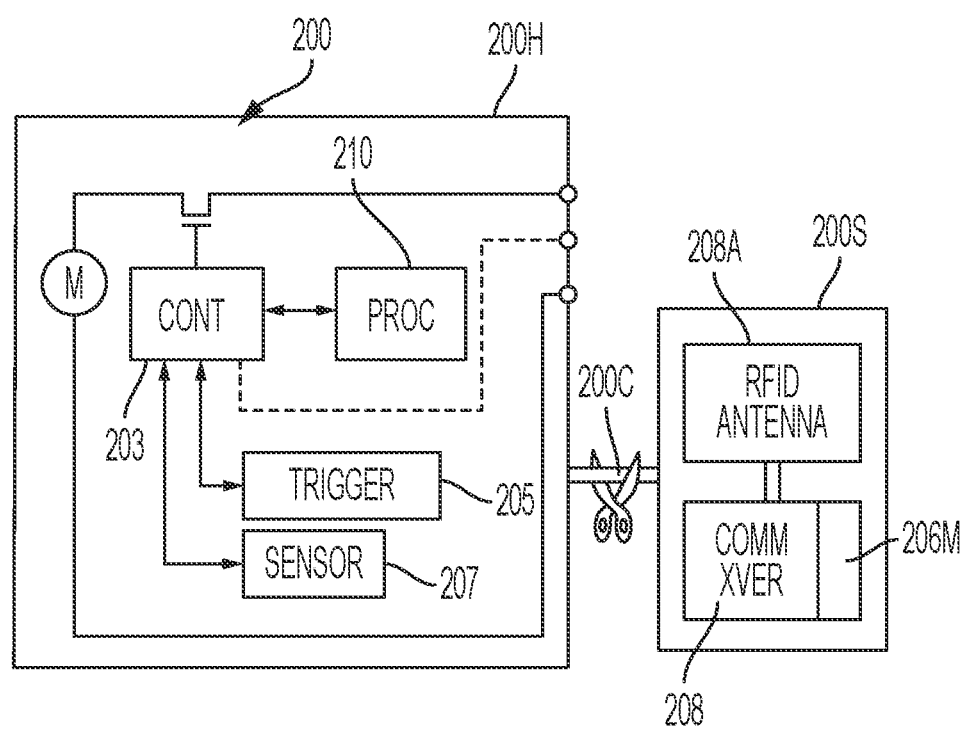
FIG. 14 is a block diagram of a fifth embodiment of a power tool that is part of the theft deterring system.

FIG. 13 shows an alternative embodiment of power tool 200. In this embodiment, communication circuit 208 and antenna 208A are not connected to state circuit 206. Instead controller 203 may be connected to an independent processor 210 that controls and/or interacts with controller 203. Because communication circuit 208 and antenna 208A are not connected to processor 210, processor 210 cannot access memory 206M and thus it cannot determine the status information of memory 206M. Therefore the power tool 200 cannot be deactivated.

However persons skilled in the art will recognize that it may be advantageous to connect memory 206M to communication circuit 208 and antenna 208A. Such arrangement would allow the status information in memory 206M to be changed (even if power tool 200 would not be deactivated) and thus allow power tool 200 to be recognized and processed by the theft deterring systems 100 shown in FIGS. 5, 8 and 11.

Persons skilled in the art shall recognize that the combination of memory 206M, communication circuit 208 and antenna 208A may be disposed within the same housing 200H as the rest of the components of power tool 200. Alternatively the combination of memory 206M, communication circuit 208 and antenna 208A may be disposed within the a separate housing 200S, which is preferably attached of housing 200H via a connector 200C. Such connector 200C may be a plastic strip, which can be cut after power tool 200 is processed by the theft deterring systems 100 shown in FIGS. 5, 8 and 11, separating housing 200H from housing 200S.

Figure 3:
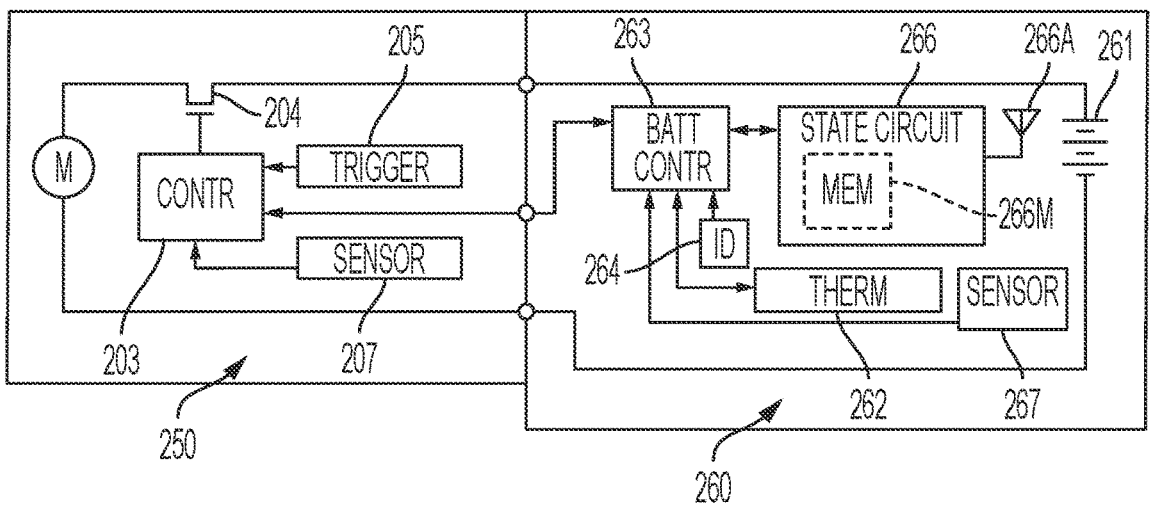
FIG. 3 is a block diagram of a second embodiment of a power tool that is part of the theft deterring system.

Referring to FIG. 3, power tool 250 may have similar features to power tool 200, and like numerals refer to like parts. Persons skilled in the art shall recognize that the teachings of the different embodiments of power tool 200 disclosed below and above are incorporated herein. Power tool 250 may have a motor M connected to a battery pack 260. A controller 203 may control a switch or FET 204 for controlling the amount of power provided to motor M. Controller 203 may use inputs from the trigger 205 and other sensors 207 to vary the amount of power provided to motor M.

Battery pack 260 may have at least one cell 261, which is preferably rechargeable. In addition, battery pack 260 may have a battery control circuit 263 which receives inputs from different sensors 267, thermistor 262, ID resistor 264 and/or controller 203 to provide data and/or instructions to controller 203. Such data and/or instructions can be provided by battery control circuit 263 to controller 203 upon request of controller 203, or automatically. Such data can be used by controller 203 to determine the amount of power provided to motor M. Alternatively or additionally, battery control circuit 263 can provide instructions to controller 203 on the amount of power provided to motor M.

Battery control circuit 263 may also receive input from a state circuit 266. State circuit 266 may have a memory 266M which stores a state value. State circuit 266 may have an antenna 266A which receives a signal from tag programmer 150. Persons skilled in the art may recognize that state circuit 266 may be a passive RFID tag circuit with rewritable memory (which can be powered by the signal transmitted by tag programmer 150), or an active RFID tag with rewritable memory (which can be powered by the cell(s) 261 or a separate battery cell (not shown)).

With such arrangement, the memory 266M can be set to have a value representative of a first state. For example, such value may be "0" which could represent an unactivated state. Such value can be set at manufacture or during shipping from the factory.

A person may take such power tool 250 or battery pack 260 from a store display to a register for payment. At that time, a store employee can use tag programmer 150 to change the value set in memory 266M. For example, such value can be changed to "1" which could represent an activated state. When the person then tries to use the power tool 250, controller 203 would query battery control circuit 263, state circuit 266 and/or memory 266M when trigger 205 is activated. Once controller 203 sees the value representing the activated state, it can provide power to the motor M.

If a person were to steal power tool 250 or battery pack 260 without it being properly processed at check out, the value set in memory 266M would not be changed. As before, when the person then tries to use the power tool 250, controller 203 would query battery control circuit 263, state circuit 266 and/or memory 266M when trigger 205 is activated. Because controller 203 would not see the value representing the activated state (or instead see a value representing the unactivated state), controller 203 would not provide any power to the motor M, or instead it could provide power to motor M at a lower amount than if the memory 266M had the value representing the activated state.

Persons skilled in the art shall recognize that the system 100 can have more than two states. For example, memory 266M could be programmed to have different values representing unactivated, partly activated and fully activated states. In the unactivated state, power tool 250 may not turn on, may only work at a lower setting than when fully activated, and/or may only have some features (such a motor soft start) working, if any. In the partly activated state, power tool 250 may only work at a lower setting than when fully activated and/or may work at the same setting as a fully activated power tool but only have some features (such a motor soft start) working, if any. In the fully activated state, power tool 250 may work at the full settings and/or have all features (such a motor soft start) working.

Figure 4:
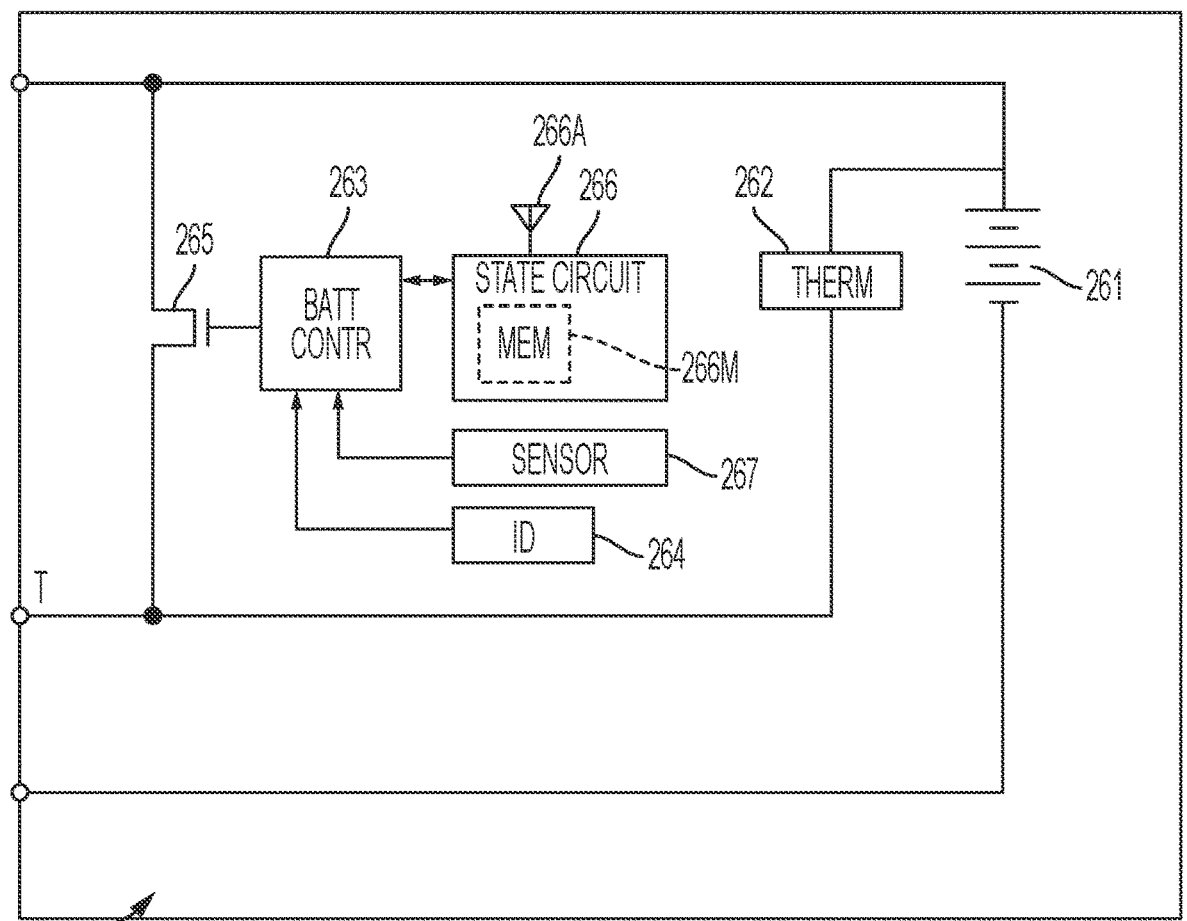
FIG. 4 is a block diagram of an embodiment of a power tool battery pack that is part of the theft deterring system

An alternative battery pack 260 is shown in FIG. 4, where like numerals refer to like parts. In this embodiment, controller 203 can receive temperature data from thermistor 262, so if the temperature of battery pack 260 goes above a certain threshold, it can stop providing power to motor M. Battery control circuit 263 does not provide instructions to controller 203 upon request of controller 203.

Instead, battery control circuit 263 controls a switch or FET 265. If battery control circuit 263 turns on FET 265, the voltage of the terminal T is raised. Controller 203 could interpret such voltage to be a high temperature signal from thermistor 262, and stop providing power to motor M.

Battery control circuit 263 can receive inputs from different sensors 267 and/or ID resistor 264. Like before, battery control circuit 263 may also receive input from state circuit 266. When the person then tries to use the power tool 250, battery control circuit 263 would sense the current draw. In view of such current draw, battery control circuit 263 would query state circuit 266 and/or memory 266M. Once battery control circuit 263 sees the value representing the activated state, it would not activate FET 265, allowing controller 203 to provide power to the motor M.

If a person were to steal power tool 250 or battery pack 260 without it being properly processed at check out, the value set in memory 266M would not be changed. As before, battery control circuit 263 would sense the current draw. In view of such current draw, battery control circuit 263 would query state circuit 266 and/or memory 266M. Once battery control circuit 263 sees the value representing the unactivated state, it would activate FET 265, which would urge controller 203 to not provide power to the motor M.

Persons skilled in the art shall recognize that memories 206M, 266M may also be reprogrammed via a non-wireless method. For example, power tools 200, 250 and/or battery packs 260 may have a USB port which allows someone at check out to plug in a device 150 that would reprogram memories 206M, 266M to have the value representative of the activated states. Alternatively such device 150 can be plugged into the terminals of power tool 250, power cord 201 and/or battery pack 260.

Figure 5:
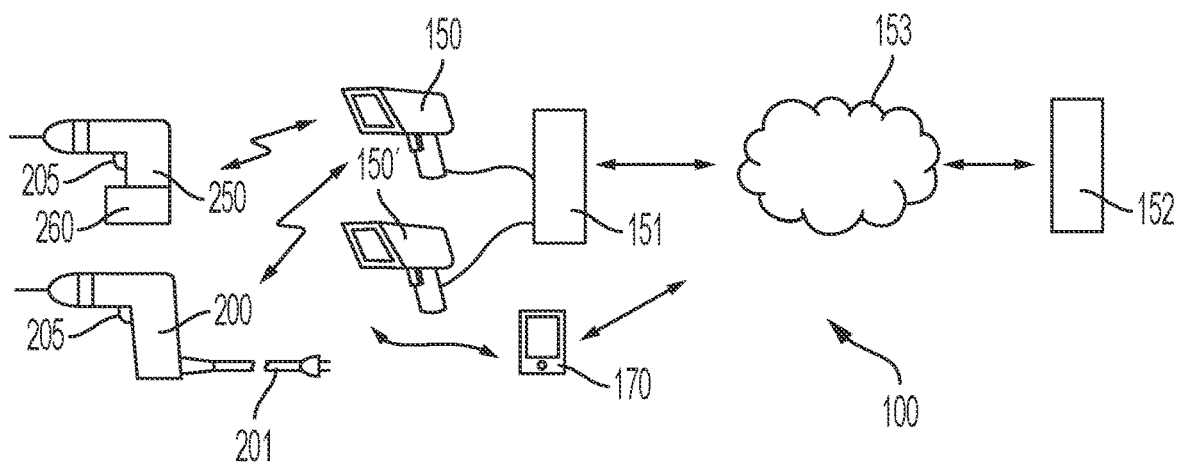
FIG. 5 illustrates a second embodiment of the theft deterring system.

FIG. 5 illustrates a second embodiment of the theft deterring system 100, where like numerals refer to like parts. Theft deterring system 100 preferably includes a power tool 200 and/or 250, and a tag programmer 150 connected to a point-of-sale (POS) system 151. POS system 151 is preferably connected to a remote server 152. Server 152 may have access to a database 152D (shown in FIG. 6). POS system 151 and server 152 may exchange information via the internet, cloud services and/or other data communication/exchange systems 153.

As in the previous embodiment, the memory 206M of a power tool 200, 250 (and/or battery pack 260) can be set to have a value representative of a first state. For example, such value may be "0", which could represent an unactivated state or a "not purchased" status. Such value can be set at manufacture or during shipping from the factory. by default. Because of such programmed status, the product(s) cannot be turned on or used. To enable the product, the memory 206M would need to be set to have a value representative of a second state. For example, such value may be "1", which could represent an activated state or a "purchased" status, which would allow the product(s) to be turned on, activated or usable.

Figure 6:
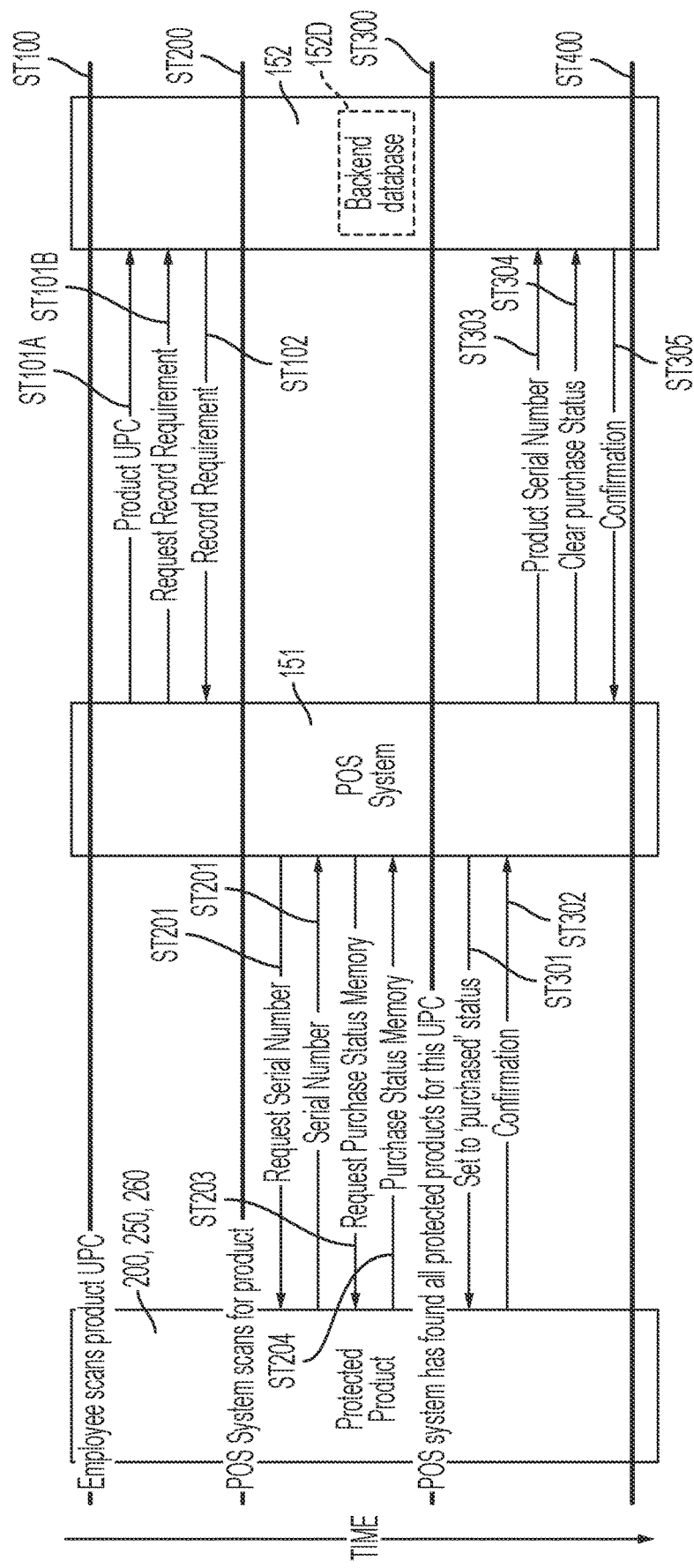
FIG. 6 is a data flow diagram illustrating a process for activating a purchased product with the theft deterring system of FIG. 5.

FIG. 6 is a data flow diagram illustrating a process for activating a purchased product at a point of purchase. Under such process, a customer can take a power tool 200, 250 to POS system 151 to purchase. At such point, a scanner and/or tag programmer 150 may scan the product's Universal Product Code (UPC) code and/or ping state circuit 206, which would return information about the product being checked out (ST100).

Once the POS system 151 receives such information from the product or its UPC code, POS system 151 queries server 152 (and backend database 152D) by sending the received UPC code information or product information (ST101A) and requesting to receive additional product specific information (ST101B). Server 152 would access database 152D to obtain and provide the requested information. The POS system 151 would accordingly receive information from server 152 about the product, including information on whether the products needs to be enabled (ST102).

Persons skilled in the art will recognize that one package associated with a particular UPC may contain several items therein. Accordingly, step ST102 may also include POS system 151 receiving information about the number of items in the package, the type of items that need to be activated, etc.

Once such information is received, POS system 151 (via tag programmer 150 and/or an RFID reader 150') scans for items within the package that match the type of items associated with the particular UPC code (ST200). Persons skilled in the art shall recognize that RFID reader 150' may be a handheld or stationary reader.

For each item that the RFID reader found by tag programmer 150 and/or an RFID reader 150', tag programmer 150 and/or an RFID reader 150' requests the serial number memory of the item (ST201) as well as the value in the item's memory 206M (ST203), which would denote its purchased/activated or unactivated/not purchased status. The item can then provide its serial number (ST202) and the value in the item's memory 206M denoting its purchased/activated or unactivated/not purchased status (ST204).

POS system 151 keeps an inventory of the responsive items to confirm that all the expected items in a package have been scanned and accounted for. For example, if POS system 151 expects a particular package to have five responsive items, POS system 151 will count the number of responsive items to determine whether such number matches the expected number. If the number of responsive items does not match the expected number of responsive items, POS system 151 will display an error message and/or prevent the purchase of such package.

The transaction however can continue if the number of responsive items matches the expected number of responsive items (ST300). The POS system 151 would then set all the activatable items' memory 206M to a purchased/activated status (ST301). Preferably, all the items would confirm to POS system 151 that all the corresponding memories 206M have been set to the purchased/activated status (ST302).

POS system 151 may send serial numbers and purchased status of the items (ST303, ST304, respectively) to server 152. Such serial numbers and purchased status may be stored in database 152D of server 152. Server 152 may provide POS system 151 with a confirmation that such information has been received and/or stored by server 152, as well as a confirmation that the transaction can be continued (ST305).

Once the POS system 151 receives such confirmation, it can proceed to process the next product and/or complete the transaction (ST400). Once the transaction is completed, the items can be used normally as they have been enabled/activated.

Persons skilled in the art will recognize that if a product is stolen and not processed via the POS system 151, the product will not be enabled/activated and cannot be used by a user.

Figure 7:
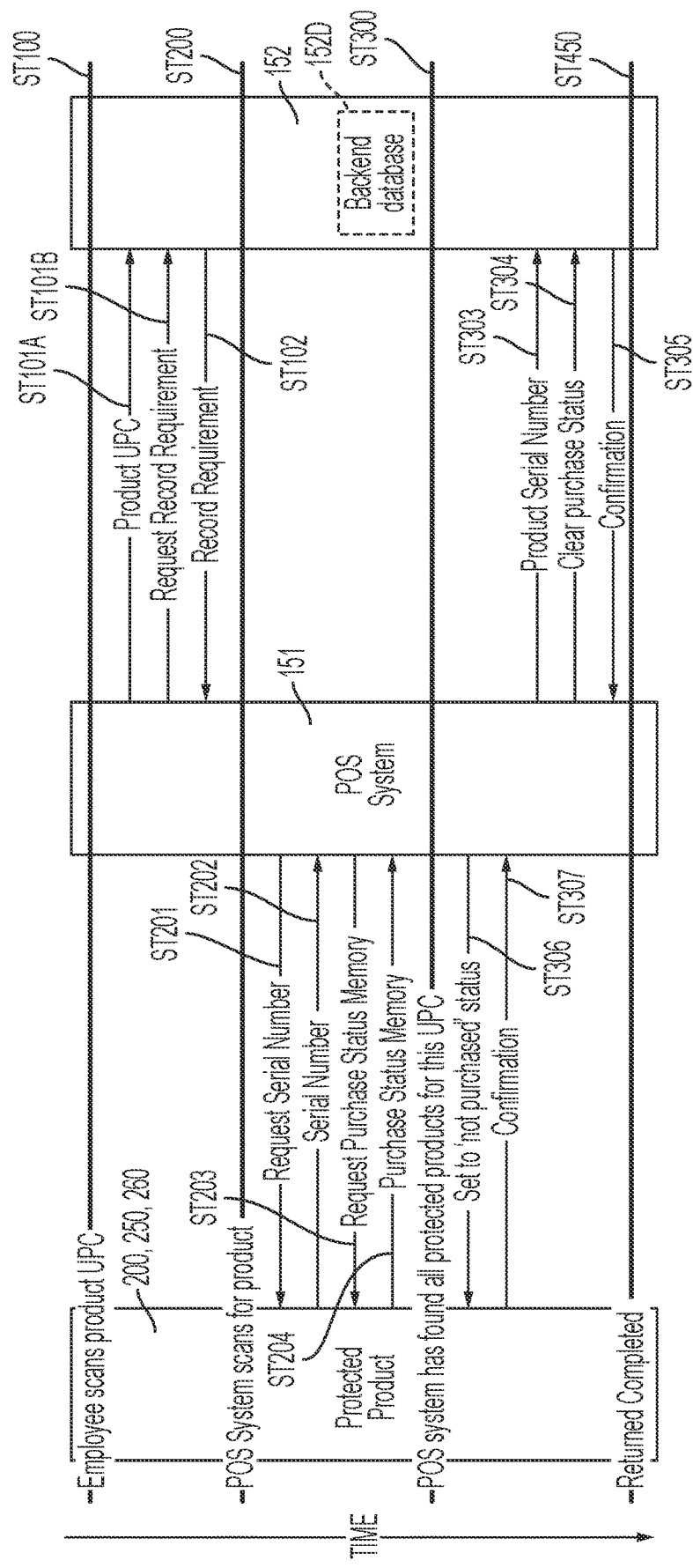
FIG. 7 is a data flow diagram illustrating a process for deactivating a purchased product with the theft deterring system of FIG. 5.

FIG. 7 is a data flow diagram illustrating a process for deactivating a purchased product at a point of purchase, for example, when such product is returned by a customer. Under such process, a customer can take a power tool 200, 250 to POS system 151 to return. At such point, a scanner and/or tag programmer 150 may scan the product's Universal Product Code (UPC) code and/or ping state circuit 206, which would return information about the product being checked out (ST100).

Once the POS system 151 receives such information from the product or its UPC code, POS system 151 queries server 152 (and backend database 152D) by sending the received UPC code information or product information (ST101A) and requesting to receive additional product specific information (ST101B). Server 152 would access database 152D to obtain and provide the requested information. The POS system 151 would accordingly receive information from server 152 about the product, including information on whether the products needs to be enabled (ST102).

Persons skilled in the art will recognize that one package associated with a particular UPC may contain several items therein. Accordingly, step ST102 may also include POS system 151 receiving information about the number of items in the package, the type of items that need to be activated, etc.

Once such information is received, POS system 151 (via tag programmer 150 and/or an RFID reader 150') scans for items within the package that match the type of items associated with the particular UPC code (ST200). Persons skilled in the art shall recognize that RFID reader 150' may be a handheld or stationary reader.

For each item that the RFID reader found by tag programmer 150 and/or an RFID reader 150', tag programmer 150 and/or an RFID reader 150' requests the serial number memory of the item (ST201) as well as the value in the item's memory 206M (ST203), which would denote its purchased/activated or unactivated/not purchased status. The item can then provide its serial number (ST202) and the value in the item's memory 206M denoting its purchased/activated or unactivated/not purchased status (ST204).

POS system 151 keeps an inventory of the responsive items to confirm that all the expected items in a package have been scanned and accounted for. For example, if POS system 151 expects a particular package to have five responsive items, POS system 151 will count the number of responsive items to determine whether such number matches the expected number. If the number of responsive items does not match the expected number of responsive items, POS system 151 will display an error message and/or prevent the return of such package.

The transaction however can continue if the number of responsive items matches the expected number of responsive items (ST300). The POS system 151 would then set all the activatable items' memory 206M to an unactivated/not purchased status (ST306). Preferably, all the items would confirm to POS system 151 that all the corresponding memories 206M have been set to the unactivated/not purchased (ST307).

POS system 151 may send serial numbers and purchased status of the items (ST303, ST304, respectively) to server 152. Such serial numbers and purchased status may be stored in database 152D of server 152. Server 152 may provide POS system 151 with a confirmation that such information has been received and/or stored by server 152, as well as a confirmation that the transaction can be continued (ST305).

Once the POS system 151 receives such confirmation, it can proceed to process the next product and/or complete the transaction (ST450). Once the transaction is completed, the items can no longer be used as they have been disenabled/disactivated.

Persons skilled in the art shall recognize that the POS system 151 may have the capability of communicating with the memory 206M of a power tool 200, 250 (and/or battery pack 260) via a Bluetooth Low Energy (BLE) connection using the BLE communication protocol. With such set-up, the POS system 151 can modify the memory 206M of a power tool 200, 250 (and/or battery pack 260) as described above.

Preferably POS system 151 has a BLE communication circuit configured as a BLE Central device. Preferably state circuit 206 and/or communication circuit 208 can transmit information to the POS system 151 according to the BLE communication protocol.

Persons skilled in the art will recognize that state circuit 206 and/or communication circuit 208 can accordingly act as a BLE communication circuit hosting a custom profile. State circuit 206 and/or communication circuit 208 preferably emits BLE advertisements at a period between 0.1 seconds and 10 seconds. Such BLE advertisement preferably contains manufacturer-specific data, which may include the USN of the product, whether the product has been sold, not sold, and/or whether the product does not need to be sold (to accommodate purchase channels that will not require anti-theft functionality)

Figure 15:
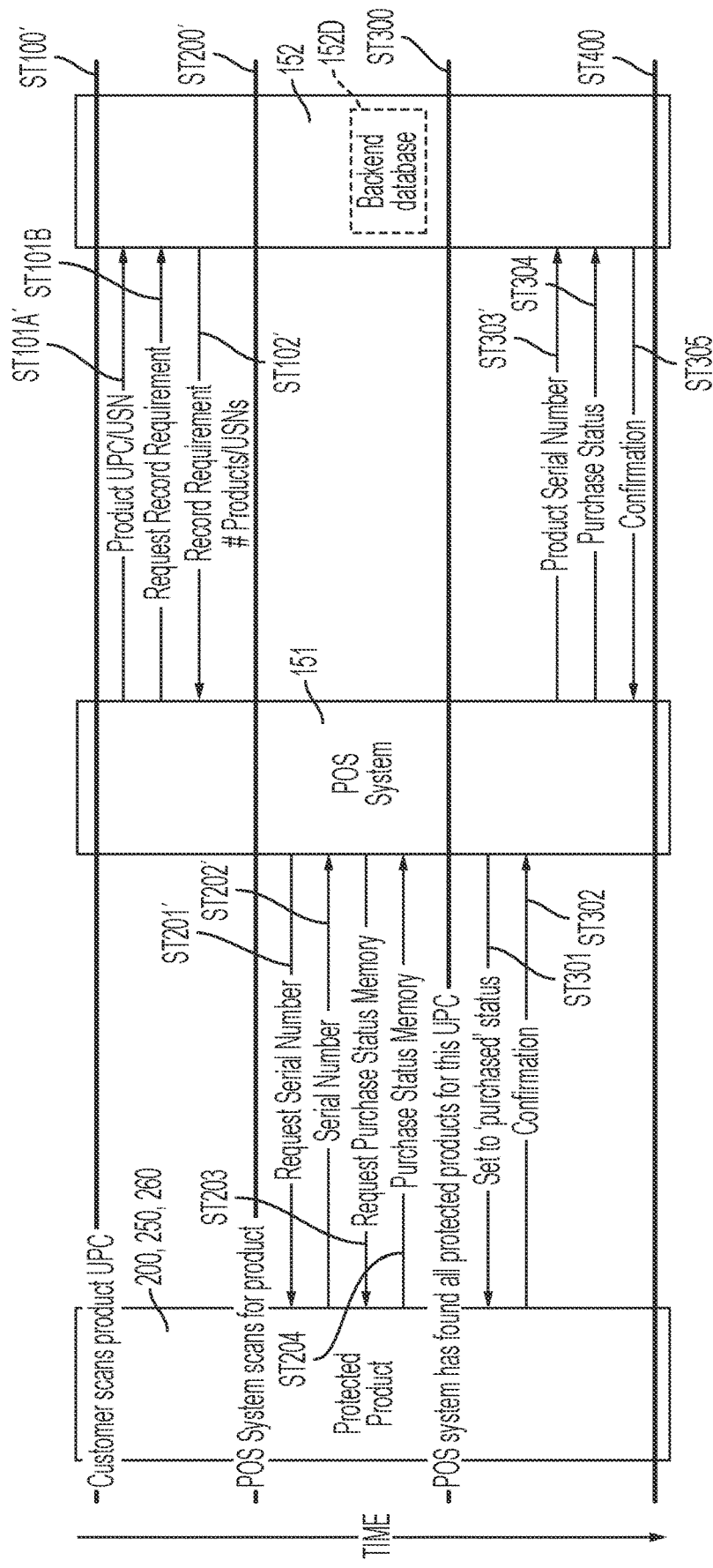
FIG. 15 is a data flow diagram illustrating an alternate process for activating a purchased product with the theft deterring system of FIG. 5.

FIG. 15 is a data flow diagram illustrating a process for activating a purchased product at a point of purchase, where like numerals refer to like steps or parts. Under such process, a customer can take a power tool 200, 250 to POS system 151 to purchase. At such point, POS system 151 may communicate with state circuit 206 via BLE to obtain the product's Universal Product Code (UPC) code and/or the serial number (USN) of the product being checked out (ST100').

Once the POS system 151 receives such information from the product, POS system 151 queries server 152 (and backend database 152D) by sending the received UPC code and/or USN information or product information (ST101A') and requesting to receive additional product specific information (ST101B). Server 152 would access database 152D to obtain and provide the requested information. The POS system 151 would accordingly receive information from server 152 about the product, including information on whether the products needs to be enabled (ST102').

Persons skilled in the art will recognize that one package associated with a particular UPC may contain several items therein. Accordingly, step ST102 may also include POS system 151 receiving information about the number of items in the package, the type of items that need to be activated, etc.

Once such information is received, POS system 151 scans for items within the package that match the type of items associated with the particular UPC code (ST200'). For each item found POS system 151, POS system 151 requests the USN (ST201') as well as the value in the item's memory 206M (ST203), which would denote its purchased/activated or unactivated/not purchased status. The item can then provide its USN (ST202') and the value in the item's memory 206M denoting its purchased/activated or unactivated/not purchased status (ST204).

POS system 151 keeps an inventory of the responsive items to confirm that all the expected items in a package have been scanned and accounted for. For example, if POS system 151 expects a particular package to have five responsive items, POS system 151 will count the number of responsive items to determine whether such number matches the expected number. If the number of responsive items does not match the expected number of responsive items, POS system 151 will display an error message and/or prevent the purchase of such package.

The transaction however can continue if the number of responsive items matches the expected number of responsive items (ST300). The POS system 151 would then set all the activatable items' memory 206M to a purchased/activated status (ST301). Preferably, all the items would confirm to POS system 151 that all the corresponding memories 206M have been set to the purchased/activated status (ST302).

POS system 151 may send USNs and purchased status of the items (ST303', ST304, respectively) to server 152. Such serial numbers and purchased status may be stored in database 152D of server 152. Server 152 may provide POS system 151 with a confirmation that such information has been received and/or stored by server 152, as well as a confirmation that the transaction can be continued (ST305).

Once the POS system 151 receives such confirmation, it can proceed to process the next product and/or complete the transaction (ST400). Once the transaction is completed, the items can be used normally as they have been enabled/activated.

Persons skilled in the art will recognize that if a product is stolen and not processed via the POS system 151, the product will not be enabled/activated and cannot be used by a user.

Figure 16:
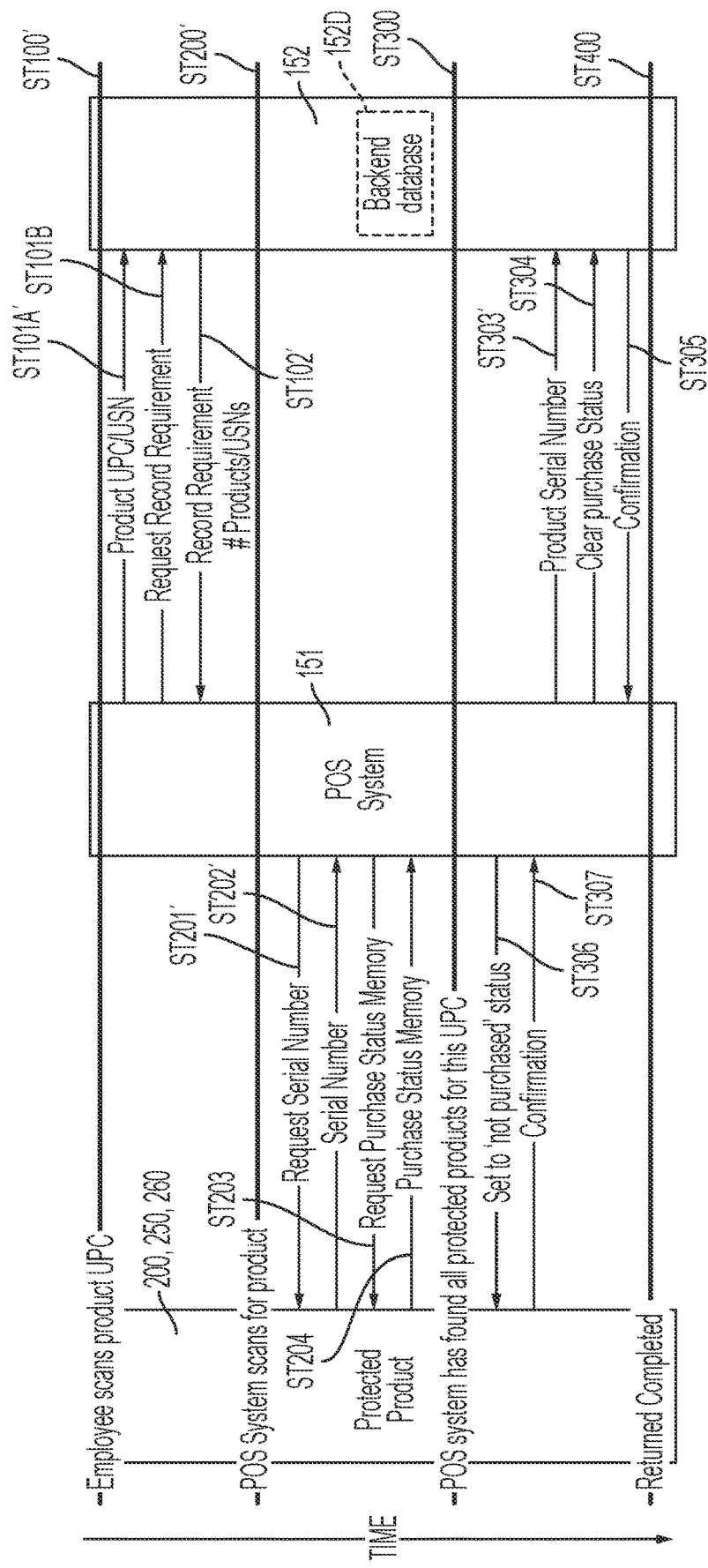
FIG. 16 is a data flow diagram illustrating an alternate process for deactivating a purchased product with the theft deterring system of FIG. 5.

FIG. 16 is a data flow diagram illustrating a process for deactivating a purchased product at a point of purchase, for example, when such product is returned by a customer. Under such process, a customer can take a power tool 200, 250 to POS system 151 to return it. At such point, POS system 151 may communicate with state circuit 206 via BLE to obtain the product's UPC and/or USN, which would return information about the product being checked out (ST100').

Once the POS system 151 receives such information from the product or its UPC code, POS system 151 queries server 152 (and backend database 152D) by sending the received UPC code information or product information (ST101A') and requesting to receive additional product specific information (ST101B). Server 152 would access database 152D to obtain and provide the requested information. The POS system 151 would accordingly receive information from server 152 about the product, including information on whether the products needs to be enabled (ST102').

Persons skilled in the art will recognize that one package associated with a particular UPC may contain several items therein. Accordingly, step ST102' may also include POS system 151 receiving information about the number of items in the package, the type of items that need to be activated, etc.

Once such information is received, POS system 151 scans for items within the package that match the type of items associated with the particular UPC code (ST200'). For each found item POS system 151 can request the USN (ST201') as well as the value in the item's memory 206M (ST203), which would denote its purchased/activated or unactivated/not purchased status. The item can then provide its USN (ST202') and the value in the item's memory 206M denoting its purchased/activated or unactivated/not purchased status (ST204).

POS system 151 keeps an inventory of the responsive items to confirm that all the expected items in a package have been scanned and accounted for. For example, if POS system 151 expects a particular package to have five responsive items, POS system 151 will count the number of responsive items to determine whether such number matches the expected number. If the number of responsive items does not match the expected number of responsive items, POS system 151 will display an error message and/or prevent the return of such package.

The transaction however can continue if the number of responsive items matches the expected number of responsive items (ST300). The POS system 151 would then set all the activatable items' memory 206M to an unactivated/not purchased status (ST306). Preferably, all the items would confirm to POS system 151 that all the corresponding memories 206M have been set to the unactivated/not purchased (ST307).

POS system 151 may send USNs and purchased status of the items (ST303', ST304, respectively) to server 152. Such USNs and purchased status may be stored in database 152D of server 152. Server 152 may provide POS system 151 with a confirmation that such information has been received and/or stored by server 152, as well as a confirmation that the transaction can be continued (ST305).

Once the POS system 151 receives such confirmation, it can proceed to process the next product and/or complete the transaction (ST450). Once the transaction is completed, the items can no longer be used as they have been disenabled/disactivated.

Figure 8:
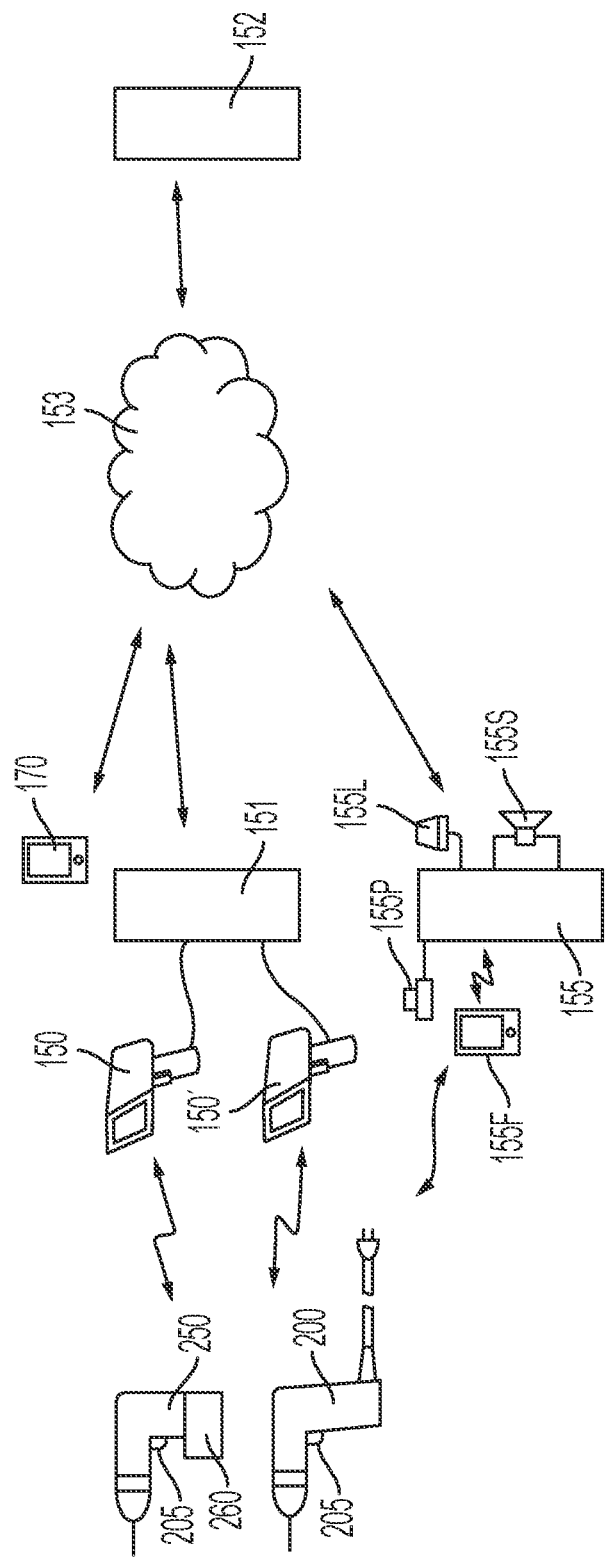
FIG. 8 illustrates a third embodiment of the theft deterring system.

FIG. 8 illustrates a third embodiment of the theft deterring system 100, where like numerals refer to like parts. Theft deterring system 100 preferably includes a power tool 200 and/or 250, and a tag programmer 150 connected to a point-of-sale (POS) system 151. POS system 151 is preferably connected to a remote server 152. Server 152 may have access to a database 152D (shown in FIG. 6). POS system 151 and server 152 may exchange information via the internet, cloud services and/or other data communication/exchange systems 153.

Theft deterring system 100 preferably includes a gate sensor 155, which is preferably set at an entrance and/or exit of a store or location. Gate sensor 155 may have at least one alarm light 155L and/or at least one alarm speaker 155S. Gate sensor 155 and server 152 may exchange information via the internet, cloud services and/or other data communication/exchange systems 153.

As in the previous embodiment, the memory 206M of a power tool 200, 250 (and/or battery pack 260) can be set to have a value representative of a first state. For example, such value may be "0", which could represent an unactivated state or a "not purchased" status. Such value can be set at manufacture or during shipping from the factory. by default. Because of such programmed status, the product(s) cannot be turned on or used. To enable the product, the memory 206M would need to be set to have a value representative of a second state. For example, such value may be "1", which could represent an activated state or a "purchased" status, which would allow the product(s) to be turned on, activated or usable.

Figure 9:
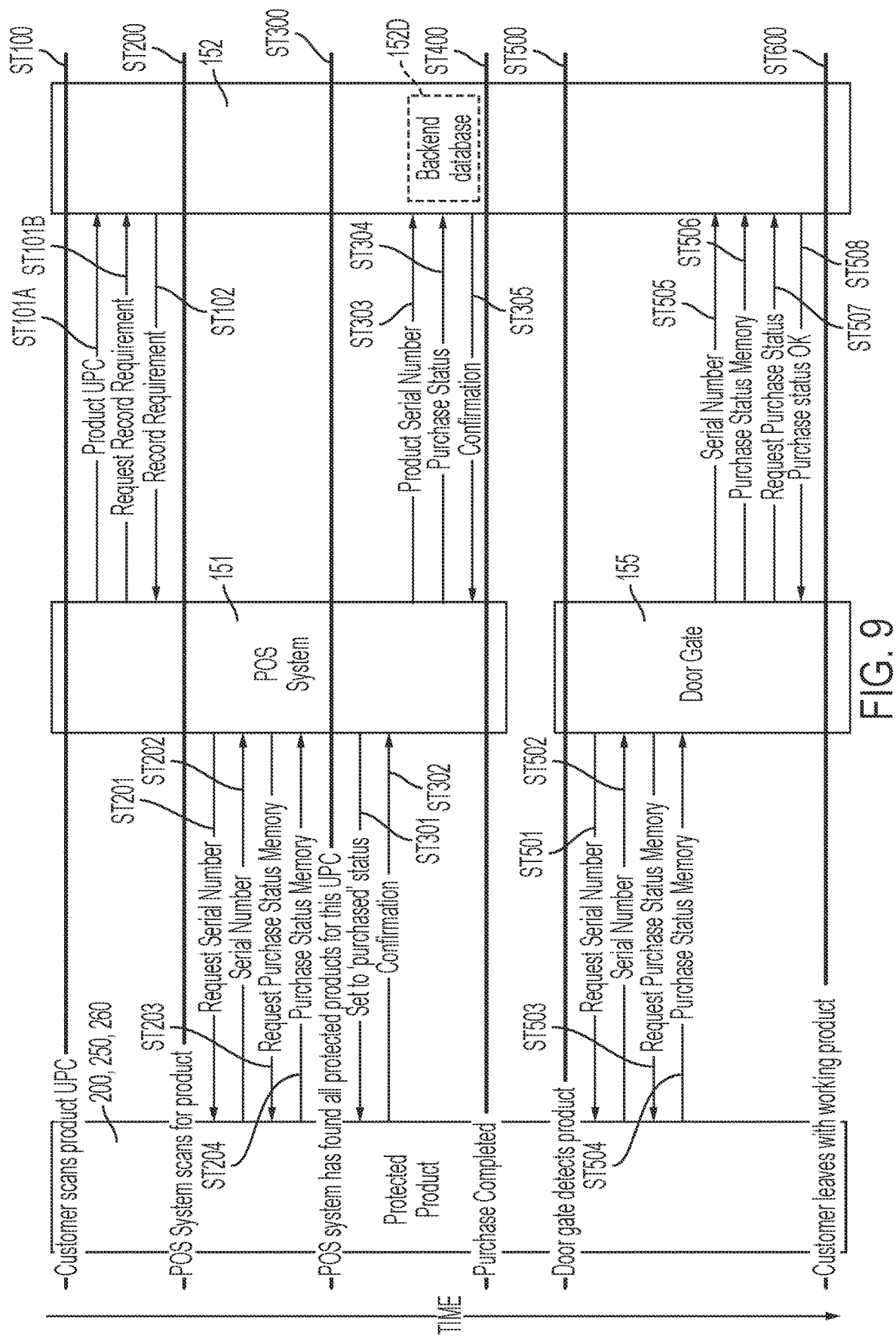
FIG. 9 is a data flow diagram illustrating a process for activating a purchased product with the theft deterring system of FIG. 8.

FIG. 9 is a data flow diagram illustrating a process for activating a purchased product at a point of purchase. Under such process, a customer can take a power tool 200, 250 to POS system 151 to purchase. At such point, a scanner and/or tag programmer 150 may scan the product's Universal Product Code (UPC) code and/or ping state circuit 206, which would return information about the product being checked out (ST100).

Once the POS system 151 receives such information from the product or its UPC code, POS system 151 queries server 152 (and backend database 152D) by sending the received UPC code information or product information (ST101A) and requesting to receive additional product specific information (ST101B). Server 152 would access database 152D to obtain and provide the requested information. The POS system 151 would accordingly receive information from server 152 about the product, including information on whether the products needs to be enabled (ST102).

Persons skilled in the art will recognize that one package associated with a particular UPC may contain several items therein. Accordingly, step ST102 may also include POS system 151 receiving information about the number of items in the package, the type of items that need to be activated, etc.

Once such information is received, POS system 151 (via tag programmer 150 and/or an RFID reader 150') scans for items within the package that match the type of items associated with the particular UPC code (ST200). Persons skilled in the art shall recognize that RFID reader 150' may be a handheld or stationary reader.

For each item that the RFID reader found by tag programmer 150 and/or an RFID reader 150', tag programmer 150 and/or an RFID reader 150' requests the serial number memory of the item (ST201) as well as the value in the item's memory 206M (ST203), which would denote its purchased/activated or unactivated/not purchased status. The item can then provide its serial number (ST202) and the value in the item's memory 206M denoting its purchased/activated or unactivated/not purchased status (ST204).

POS system 151 keeps an inventory of the responsive items to confirm that all the expected items in a package have been scanned and accounted for. For example, if POS system 151 expects a particular package to have five responsive items, POS system 151 will count the number of responsive items to determine whether such number matches the expected number. If the number of responsive items does not match the expected number of responsive items, POS system 151 will display an error message and/or prevent the purchase of such package.

The transaction however can continue if the number of responsive items matches the expected number of responsive items (ST300). The POS system 151 would then set all the activatable items' memory 206M to a purchased/activated status (ST301). Preferably, all the items would confirm to POS system 151 that all the corresponding memories 206M have been set to the purchased/activated status (ST302).

POS system 151 may send serial numbers and purchased status of the items (ST303, ST304, respectively) to server 152. Such serial numbers and purchased status may be stored in a database 152D of server 152. Server 152 may provide POS system 151 with a confirmation that such information has been received and/or stored by server 152, as well as a confirmation that the transaction can be continued (ST305).

Once the POS system 151 receives such confirmation, it can proceed to process the next product and/or complete the transaction (ST400). Once the transaction is completed, the customer can take the purchased items to the store's or location's exit.

As the customer approaches gate sensor 155, gate sensor 155 detects the product (ST500) and requests the serial number memory of the item (ST501) as well as the value in the item's memory 206M (ST503), which would denote its purchased/activated or unactivated/not purchased status. The item can then provide its serial number (ST502) and the value in the item's memory 206M denoting its purchased/activated or unactivated/not purchased status (ST504).

Gate sensor 155 may send serial numbers and purchased status of the items (ST505, ST506, respectively) to server 152 and/or POS system 151. Gate sensor 155 may also request from server 152 and/or POS system 151 information on the purchased status of the items (ST507). Server 152 and/or POS system 151 may provide gate sensor 155 with the purchase status of the item and/or a confirmation that the item has been properly purchased (ST508).

Once the gate sensor 155 receives such confirmation, it can proceed to process the next product until all products have been reviewed. The customer can exit with the enabled items (ST600).

Figure 10:
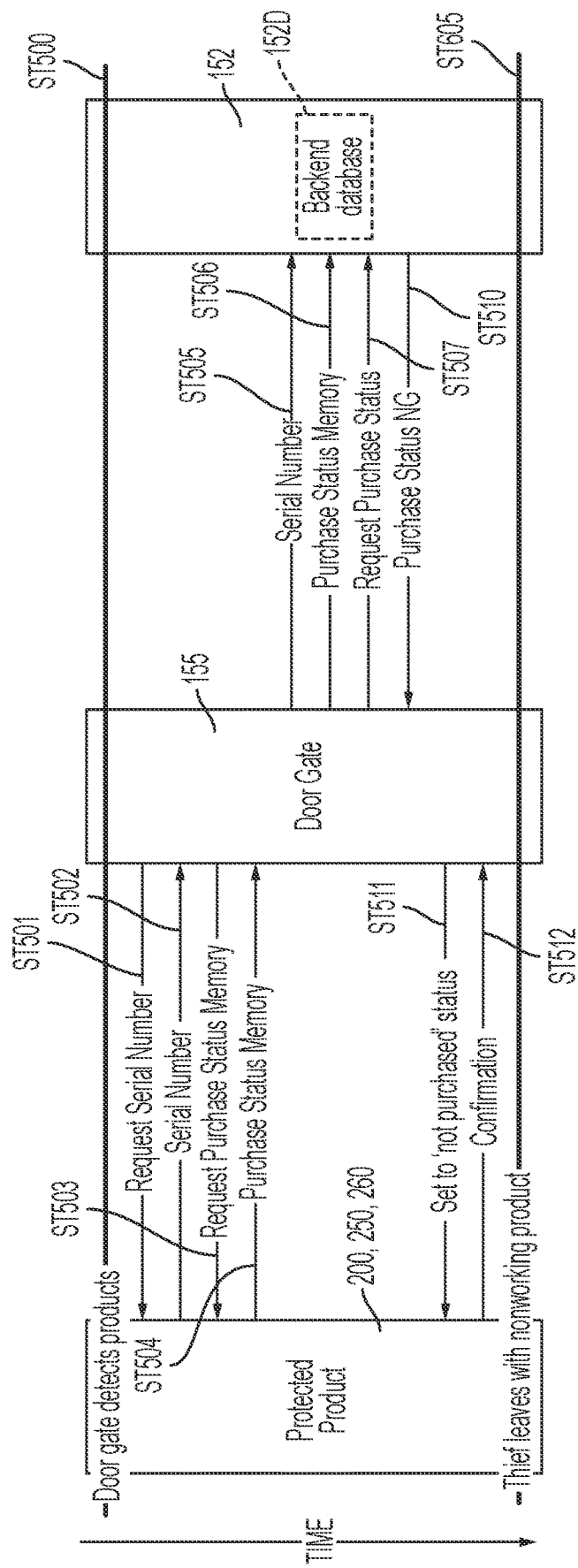
FIG. 10 is a data flow diagram illustrating a process for deactivating a stolen/not purchased product with the theft deterring system of FIG. 8.

FIG. 10 however illustrates the process if the items have not been properly processed by POS system 151 (for example, if a thief attempts to steal the item without paying for it). As before, when the customer approaches gate sensor 155, gate sensor 155 detects the product (ST500) and requests the serial number memory of the item (ST501) as well as the value in the item's memory 206M (ST503), which would denote its purchased/activated or unactivated/not purchased status. The item can then provide its serial number (ST502) and the value in the item's memory 206M denoting its purchased/activated or unactivated/not purchased status (ST504).

Gate sensor 155 may send serial numbers and purchased status of the items (ST505, ST506, respectively) to server 152 and/or POS system 151. Gate sensor 155 may also request from server 152 and/or POS system 151 information on the purchased status of the items (ST507). Since the items have not been properly enabled by server 152 and/or POS system 151, server 152 and/or POS system 151 cannot provide gate sensor 155 with a confirmation that the item has been properly purchased. Instead, server 152 and/or POS system 151 send a confirmation to gate sensor 155 that the item has not been properly purchased (ST510).

Once the gate sensor 155 receives such confirmation, it can set the item's memory 206M to an unactivated/non-purchased status (ST511). Preferably, the affected item would confirm to gate sensor 155 that the memory 206M has been set to the unactivated/non-purchased status (ST512). Gate sensor 155 can proceed to process the next product until all products have been reviewed.

Gate sensor 155 may also have a button input 155P and/or a wireless button input 155F, such as a keyfob. Such button inputs 155P, 155F can be pressed by the store staff to set the item's memory 206M to an unactivated/non-purchased status.

Gate sensor 155 may also activate alarm light(s) 155L and/or alarm speaker(s) 155S to alert the store staff of the attempt to remove non-purchased products from the store. If the customer successfully exits with the product, he or she will leave with disabled/non-operating items (ST605).

In addition, gate sensor 155 can report to server 152 and/or POS system 151 such exit. Server 152 can store the item's information, such as serial number, etc. in a database noting it as "stolen." Server 152 and/or POS system 151 can also send such information to a police station or database. If and when a person brings the stolen item to a service center or store, the system will report the stolen status.

Persons skilled in the art will recognize that returned items can be processed by the third embodiment of the theft deterring system 100, in the same manner shown related to FIG. 7 and described above.

Figure 11:
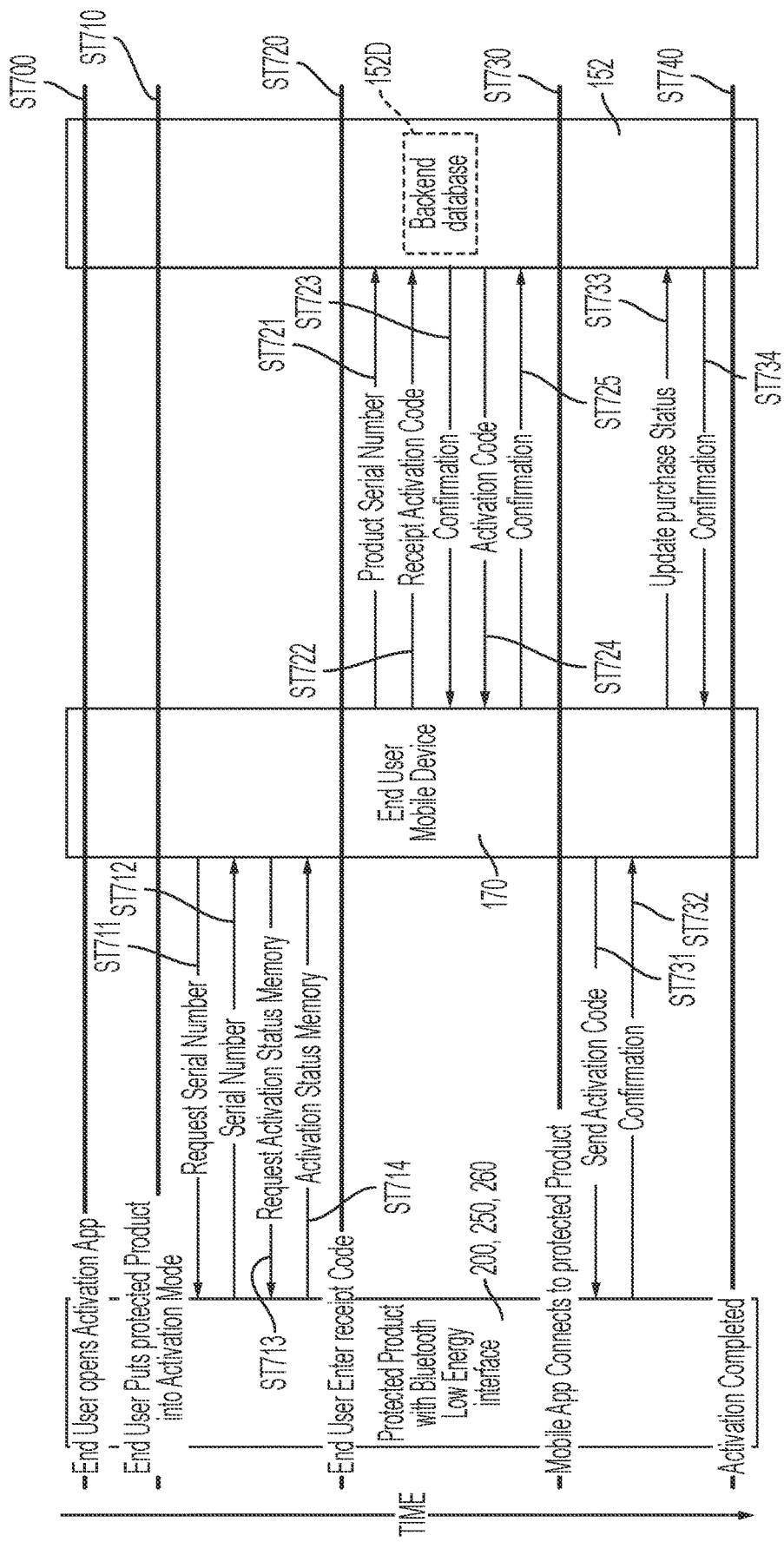
FIG. 11 is a data flow diagram illustrating a process for activating a purchased product with the theft deterring systems of FIGS. 5 and 8.

Referring to FIGS. 5, 8 and 11, theft deterring system 100 may include a computing device 170, such as a smart-phone, computer or tablet, that can contact items 200, 250, 260, server 152 and/or POS system 151. Persons skilled in the art will recognize that computing device 170 will preferably connect wireless with items 200, 250, 260, preferably using Bluetooth or Bluetooth Low Energy communication formats.

A user can use computing device 170 to activate items 200, 250, 260 after they have been processed by POS system 151 or even if they haven't been processed by POS system 151, such as when the item is shipped from another location. Once the user is ready to activate items 200, 250, 260, the user can open an app on computing device 170 (ST700).

The user can then put the items 200, 250, 260 in an activation mode (ST710). Once the items 200, 250, 260 are in the activation mode, computing device 170 can request the serial number memory of the item (ST711) as well as the value in the item's memory 206M (ST713), which would denote its purchased/activated or unactivated/not purchased status. The item can then provide its serial number (ST712) and the value in the item's memory 206M denoting its purchased/activated or unactivated/not purchased status (ST714).

Upon a request from computing device (ST720), the user can input a code that is printed in the sales receipt received from the POS system 151 or in the shipping package. (Such code may be provided by server 152 upon request of the POS system 151.) Computing device 170 would then transmit the serial number and code to server 152 (ST721-ST722, respectively). Server 152 would access database 152D to store the serial number and code. Server 152 would then send to computing device 170 a confirmation that such information has been received and/or stored by server 152, as well as an activation code (ST723-ST724, respectively). Computing device 170 preferably sends a confirmation that such activation code has been received (ST725).

The computing device 170 then preferably connects to items 200, 250, 260 (ST730) and sends items 200, 250, 260 at least an activation code (ST731). Items 200, 250, 260 analyze such activation code to confirm it is a valid code. If so, items 200, 250, 260 send a confirmation to computing device 170 that the activation code has been accepted and that items 200, 250, 260 are now activated (ST732).

Computing device 170 sends a request to server 152 to update the purchase status of items 200, 250, 260 (ST733). Server 152 would store such status information in the database 152D. Server 152 preferably sends a confirmation that such status information has been received and/or stored by server 152 (ST734). Because the items 200, 250, 260 have been activated, the user can use such items (ST740).

Persons skilled in the art shall recognize the sales receipt may have other instructions on how to enable the items 200, 250, 260. (Such instructions on the sales receipt can be obtained by the POS system 151 from server 152.)

For example, the receipt may instruct the user to pulse trigger 205 a short time, then a longer time, then another short time. The instructions may also state the relative length of each trigger pulse. State circuit 206 may recognize such sequence as an activating sequence and change the status flag in memory 206M accordingly. Items 200, 250, 260 can then communicate with computing device 170 and/or server 152 to then transmit the serial number and activation status to server 152. Server 152 would access database 152D to store the serial number and activation status. Server 152 would then send to the items a confirmation that such information has been received and/or stored by server 152.

Persons skilled in the art shall recognize that different activation sequences can be created with different inputs as long as such inputs are monitored by the tool's processor/controller. For example if the tool monitors a clutch being rotated, a clutch rotation can be used as part of the sequence. Similarly if the battery monitors charge state button presses, then such button presses can be used as part of a sequence.

Furthermore, multiple activation sequences may be programmed into items 200, 250, 260. Server 152 can send items 200, 250, 260 an additional code representative of which sequence should be recognized as the correct activation sequence. Server 152 may alternatively send items 200, 250, 260 an additional code with specific pulse periods for the particular tool. For example, server 152 may send a code that effectively instructs items 200, 250, 260 to look for a trigger pulse of about 1 second, about 5 seconds and about 2 seconds. Server 152 may send a different code that effectively instructs items 200, 250, 260 to look for a trigger pulse of about 3 second, about 2 seconds and about 3 seconds. In this manner, the system would be able to create unit-specific activation codes.

If the user loses the activation code before activating the items 200, 250, 260, the user can scan a QR code on items 200, 250, 260, which will open an app on computing device 170. Such app will provide the activation code or activation sequence associated with the item in server 152 if the item is shown as purchased in the database 152D. This would then allow the user to activate items 200, 250, 260 without the sales receipt by following the instructions on computing device 170.

It will be understood that the above description and the drawings are examples of particular implementations of the invention, but that other implementations of the invention are included in the scope of the claims.

What is claimed is:

1. A theft deterring system comprising:
   a power tool comprising:
   a motor connectable to a power source,
   a switch connected to the motor,
   a controller connected to the switch, the controller controlling the switch for controlling an amount of power provided to the motor,
   a state circuit having a memory for storing a state value transmitted outside of the power tool,
   wherein the controller activates the switch to provide power to the motor when the state value stored in the memory equals a desired value.

2. The theft deterring system of claim 1, wherein the state circuit is connected to the controller.

3. The theft deterring system of claim 2, wherein the state circuit is at least one of a passive RFID tag circuit with rewritable memory and an active RFID tag with rewritable memory.

4. The theft deterring system of claim 1, wherein the power source is a battery pack connectable to the motor.

5. The theft deterring system of claim 4, wherein the battery pack comprises a battery control circuit that can provide data and/or instructions to the controller.

6. The theft deterring system of claim 4, wherein the state circuit is connected to the battery control circuit.

7. The theft deterring system of claim 4, wherein the switch is disposed within the battery pack.

8. The theft deterring system of claim 1, further comprising a tag programmer for changing the stored value.

9. The theft deterring system of claim 8, wherein the state circuit further comprises an antenna.

10. The theft deterring system of claim 9, wherein the antenna receives a signal from the tag programmer.

\* \* \* \* \*